Patented Dec. 3, 1929

1,737,686

UNITED STATES PATENT OFFICE

WALTER H. RISING, OF PAINTED POST, NEW YORK, ASSIGNOR TO CORNING GLASS WORKS, OF CORNING, NEW YORK, A CORPORATION OF NEW YORK

METHOD OF PRODUCING HEAT-ABSORBING GLASSES AND BATCHES THEREFOR

No Drawing.   Application filed May 24, 1928. Serial No. 280,389.

I have discovered that tin or its compounds when added in small quantities (1 to 2%) to batches for glasses containing iron and one or more elements of the second periodic group has an unusual catalytic effect on the state of reduction of the iron in the resultant glass in that it enables the iron to be more completely reduced than has heretofore been possible. This complete reduction of the iron in glasses results in a pure blue color in contradistinction to the green or blue-green color which is developed by reducing the iron in a glass by the usual means without the use of tin. Glasses produced by this invention possess great absorptive power for both the infra-red and visible red together with relatively high transmission for the remainder of the visible spectrum and good absorption for the ultraviolet. Such an absorption curve is unusual because, although certain copper containing glasses absorb the visible red and so-called heat absorbing glasses containing ferrous iron absorb the infra-red, no glass heretofore has been produced which will absorb both the visible red and the infra-red and at the same time permit of high transmission of the remainder of the visible spectrum.

It has long been known that iron in a glass exists in either one or both of two forms, namely, the ferric or oxidized state and the ferrous or reduced state. It is also well known that ferric iron imparts a yellow color to glass and it has been thought that ferrous iron imparts a green or blue-green color to glass. I believe that the latter is incorrect and that when the iron in a glass is completely reduced to the ferrous state, the resulting color is a pure blue and that the green or blue-green color heretofore attributed to ferrous iron is in fact a result of the combination of the color effects of ferrous and ferric iron. If we assume that the color imparted to glass by ferrous iron is blue then, since blue and yellow are complementary colors, they should tend to neutralize each other, thus decreasing the apparent color density of the glass and, if it were possible to completely reduce the iron present in a glass, one would expect the resulting color to be more dense than that obtained with the same iron content incompletely reduced. That this is true is shown by the fact that these blue glasses containing tin always have a greater color density than the same glasses having the same iron content but containing no tin. That the blue tint in glasses made in accordance with this invention is not due to tin itself has been established by trial melts not containing ferrous iron.

The following are batches which may be melted to obtain glasses embodying this invention:—

|  | A | B | C | D |
|---|---|---|---|---|
| Sand | 370 | 370 | 342 | 342 |
| Soda ash | 137 | 137 | 170 | 170 |
| Zinc oxide | 50 | 50 |  |  |
| Cadmium carbonate |  |  | 60 |  |
| Lime |  |  |  | 60 |
| Stannic oxide | 10 | 10 | 10 | 10 |
| Carbon | 1½ | 10 | 1½ | 5 |
| Ferrous oxalate | 11 | 22½ | 11 | 11 |
| Antimony trioxide |  |  |  | 10 |

The glasses which would result from melting the above batches should have approximately the following percentage compositions as calculated from the batches.

|  | A | B | C | D |
|---|---|---|---|---|
| $SiO_2$ | 72.0 | 71.5 | 68.4 | 67.0 |
| $Na_2O$ | 15.6 | 15.4 | 20.0 | 19.6 |
| $ZnO$ | 9.75 | 9.6 |  |  |
| $CdO$ |  |  | 9.0 |  |
| $CaO$ |  |  |  | 8.8 |
| $SnO$ | 1.75 | 1.75 | 1.8 | 1.8 |
| $FeO$ | .8 | 1.75 | .8 | .8 |
| $Sb_2O_3$ |  |  |  | 2.0 |

These glasses are all deep blue in color and have a characteristic high absorption for infra-red and the visible red together with a relatively high transmission for the remainder of the visible spectrum and a good absorption for ultra-violet. If the iron content of these glasses be increased the color and absorption are likewise increased and vice versa. If the tin content be increased there is no apparent change in color or absorption but, if the tin be omitted entirely, the colors of the various glasses become changed, varying from blue-green in the case of those containing zinc and cadmium to yellowish-green in the others and in this case the respective absorptions are decreased accordingly. It will be noted that the amount of stannic oxide used in these glasses is quite small.

In the above glasses the calcium may be replaced by magnesium, strontium and barium. With berylium, which also belongs to the second periodic group tin is ineffective, and mercury and radium, the other elements of this group, are obviously out of the question. Magnesium, calcium, zinc, strontium, cadmium and barium whose use is above indicated will be designated, for purposes of defining my invention, as elements of the second periodic group whose weights are between 20 and 140, while zinc and cadmium will be designated as metallic elements of the second periodic group whose atomic weights are between 60 and 120. However the purest blues are obtained in the zinc and cadmium glasses and these are obtainable with greater ease in that an excess of carbon above that required to produce complete reduction has no ill effect and the color is obtained independent of the presence of antimony.

Zinc and cadmium are more easily reducible than the other elements of the second periodic group and it is believed that these elements or, more strictly speaking, their oxides, irrespective of the presence of tin, destroy any excess of carbon above that required to hold the iron in the reduced state and thus prevent the formation of the so-called carbon-yellow color.

In order to develop blues with the other and not so easily reduced second group elements, viz, magnesium, calcium, strontium and barium, the amount of reducing agent must be carefully adjusted so as not to be in excess or else some compound of reducible nature must be added, such as $Sb_2O_3$. (See glass D.) Under these conditions good blues have been produced with magnesium, calcium, strontium and barium.

Apparently any salt or oxide of tin will produce the effect here described and I have used the following with success, metallic tin, stannous oxide (SnO), stannic oxide ($SnO_2$), stannous chloride ($SnCl_2$) and stannous oxalate ($SnC_2O_4$). Metallic tin and stannous compounds have been used in the past to a small extent as reducing agents but the action of tin or its compounds in producing the effects noted in my glasses is not a reducing action. The carbon which must be added is the effective reducing agent and the tin acts merely as a catalytic agent which apparently breaks down the equilibrium existing between ferrous and ferric iron under ordinary conditions and holds the iron at its lower state of oxidation thus permitting the use of sufficient carbon to cause complete reduction.

Ordinarily when the iron in a glass other than zinc or cadmium glasses is reduced with carbon there is a limit to the amount of carbon which may be used effectively and the most efficacious reduction in this case invariably results in a blue-green color in the glass. When more than this amount of carbon is added the excess causes development of the so-called carbon-yellow color and as the excess of carbon increases the color becomes more and more amber.

I have further discovered that in glasses containing tin compounds the limit of the carbon is much higher and in certain of my glasses (zinc and cadmium glasses) there is apparently no limit to the amount of carbon which may be added and it is apparently impossible to develop the so-called carbon-yellow color in these cases.

On the other hand when carbon is omitted from the batch tin compounds aid in reducing the iron in the presence of other reducing agents or of reducing conditions in the furnace.

Consequently in glasses produced by this invention a large amount of carbon or other reducing agent is not only permissible but a certain amount is quite necessary. Of course ferrous and stannous compounds are reducing in character and metallic iron and tin are even more so. I may add the iron and tin either as metals, as ferrous and stannous compounds, as ferric and stannic compounds or as a combination of any of these without departing from the spirit of my invention. On account of lower cost I find it preferable to use ferric oxide ($Fe_2O_3$) and stannic oxide or putty-powder ($SnO_2$) together with sufficient carbon to cause reduction of both of these ingredients.

Moreover compounds of tin seem to be unique in that this is the only element which has thus far been found to have this effect. Other elements whose properties might lead one to expect similar action do not produce this effect when substituted for tin. Such for example are antimony, arsenic and lead, which were tried by substituting them for the tin in glasses of the above types. Negative results were obtained.

When boric oxide is present in substantial quantities, in my new glasses the catalytic action of the tin is suppressed to a greater or less extent and this suppression is greater in magnesium, calcium, strontium and barium glasses than it is in zinc or cadmium glasses. On this account the former glasses are yellowish green when they contain boric oxide and their absorptive effects are much less than when $B_2O_3$ is absent. Zinc and cadmium glasses are only slightly affected in this respect by the presence of boric oxide providing the alkali content is kept fairly high, say at least 10%, the cadmium glasses less so than the zinc. In general it might be said that the catalytic effect of tin is best produced in fairly basic glasses and that as the acidity of the glass increases the effect of the tin decreases.

In another application Serial No. 280,388 filed by me of even date herewith I have described and claimed this use of tin in zinc or cadmium boro-silicates.

I find that the use of soda is preferable to the other alkalies, potash and lithia, because when the latter two are substituted for soda the colors obtained are not as good nor the absorptive power as great as when soda alone is used.

This invention may be applied to cases where it is desirable to obtain maximum absorption of infra-red or heat rays together with strong absorption of the visible spectrum which produces glare and complete absorption of the injurious ultraviolet rays, such as for example in the case of the so-called Welders glasses where such properties are desirable. To accomplish this result I merely increase the ferrous iron content of the above or similar glasses (which would result in a blue-green color) and add a salt which will impart to the glass a complementary or red color. That is to say, since the ferrous iron produces a strong absorption at the red end of the spectrum and in the ultraviolet, another element or elements is required which will produce absorption of the remainder of the spectrum in order that the glass may have the above-described desirable properties.

I find that nickel is a suitable element to furnish the red complement and that approximately equal parts of FeO and NiO (7 to 8% of each) will produce a very dense neutral colored glass possessing the above-described desirable properties and superior to ordinary Welders glasses by virtue of its practically complete absorption of the infra-red or heat rays.

The following is a batch suitable for this use:—

|  | E |
|---|---|
| $SiO_2$ | 300 |
| $Na_2CO_3$ | 103 |
| ZnO | 50 |
| $Al(OH)_3$ | 7.5 |
| $SnO_2$ | 5 |
| $Fe_2O_3$ | 40 |
| $Ni_2O_3$ | 40 |
| C | 7 |

The percentage composition of the glasses as calculated from the batch will be:

|  | E |
|---|---|
| $SiO_2$ | 61 |
| $Na_2O$ | 12.2 |
| ZnO | 10.2 |
| $Al_2O_3$ | 1 |
| SnO | 1 |
| FeO | 7.3 |
| NiO | 7.3 |

It will be noted that the batch for glass E contains carbon in excess, but this excess has no ill effect and it insures as complete reduction of the iron as possible. In this glass the carbon serves only as a reducing agent and any excess is burned out. This is characteristic of the tin-effect in zinc glasses.

The heat-absorption of the above glass as measured in terms of transmission was .1% of the infra-red or heat rays transmitted through 1 mm. of glass, with no transmission of infra-red or heat rays through 2 mm. of glass. Heat transmissions are so small that they can not be measured accurately since the values obtained are of the order of the experimental error encountered in measuring.

The color or visible absorption of glass E may easily be changed to any desired value by suitable readjustment of the proportions of iron and nickel. For instance, decrease of iron and increase of nickel gives a more reddish color while increase of iron and decrease of nickel gives a more greenish color with corresponding changes in visible absorption. Decrease of both iron and nickel produces lighter shades and vice versa. Since iron and nickel are stable elements which are not volatilized on prolonged melting it is possible to repeat any shade or color at will, which is an added advantage in the manufacture of Welders glasses.

Since addition of carbon affords the cheapest and simplest means of reducing during melting, I have referred to carbon as the reducing agent used throughout the foregoing specification. However, it is to be understood that any carbonaceous material may be used for this purpose and moreover that any substance or means which will produce in the glass a reducing action without undesirable color will accomplish some of the results above specified and fall within the broader limits and scope of my invention.

Having thus described my invention what I claim is:—

1. The method of modifying the color of glasses resulting from the melting of a batch containing an element of the second periodic group, whose atomic weight is between 20 and 140, and substantial quantities of ferrous iron and a reducing agent by the addition to the batch of a small quantity of a substance containing tin.

2. The method of modifying the color of glasses resulting from the melting of a batch containing a metallic element of the second periodic group whose atomic weight is between 60 and 120, and substantial quantities of ferric iron and a reducing agent by the addition to the batch therefor of a small quantity of a substance containing tin.

3. The hereinbefore described method of producing a heat absorbing glass which comprises melting under reducing conditions a batch containing silicon, an element of the second periodic group whose atomic weight is between 20 and 140, and tin, together with substantial quantities of iron.

4. The hereinbefore described method of producing a heat absorbing glass which comprises melting under reducing conditions a batch containing silicon, a metallic element of the second periodic group whose atomic weight is between 60 and 120, and tin, together with substantial quantities of iron.

5. A batch for a glass having a relatively high absorption for infra-red and visible red together with a relatively high transmission for the remainder of the visible spectrum and good absorption for the ultraviolet which contains substantial quantities of iron, a reducing agent and tin together with an element of the second periodic group whose atomic weight is between 20 and 140.

6. A batch for a glass having a relatively high absorption for infra-red and visible red together with a relatively high transmission for the remainder of the visible spectrum and good absorption for the ultraviolet which contains substantial quantities of iron, a reducing agent and tin together with a metallic element of the second periodic group whose atomic weight is between 60 and 120.

WALTER H. RISING.